United States Patent [19]

Ushio et al.

[11] Patent Number: 4,482,450

[45] Date of Patent: Nov. 13, 1984

[54] PROCESS FOR CATALYTIC REACTION OF HEAVY OILS

[75] Inventors: Masaru Ushio, Yokohama; Toru Morita; Takeshi Ishii, both of Kawasaki; Yasuyuki Oishi, Yokohama, all of Japan

[73] Assignee: Nippon Oil Company, Ltd., Tokyo, Japan

[21] Appl. No.: 538,361

[22] Filed: Oct. 3, 1983

Related U.S. Application Data

[63] Continuation of Ser. No. 288,363, Jul. 30, 1981.

[30] Foreign Application Priority Data

Jul. 31, 1980 [JP] Japan ............................. 55/104293

[51] Int. Cl.$^3$ .................... C10G 45/14; B03C 1/02
[52] U.S. Cl. ................................. 208/152; 208/213
[58] Field of Search ............. 208/52 CT, 152, 251 R, 208/113, 120, 213, 209; 209/8, 38, 39, 40

[56] References Cited

U.S. PATENT DOCUMENTS

| 2,348,418 | 5/1944 | Roesch et al. ............. 208/52 CT |
| 4,289,605 | 9/1981 | Bartholic ..................... 208/113 |
| 4,406,773 | 9/1983 | Hettinger, Jr. et al. ...... 208/52 CT |

Primary Examiner—Delbert E. Gantz
Assistant Examiner—Glenn A. Caldarda
Attorney, Agent, or Firm—Wenderoth, Lind & Ponack

[57] ABSTRACT

A process for catalytic reaction of heavy oils and a particulate solid medium, which comprises withdrawing a part or the whole of the used medium from the reactor, separating the withdrawn particles into the particles which have been rendered magnetic by the deposition thereon of nickel, vanadium, iron and copper originally contained in the heavy oils, and non-magnetic particles, using a high gradient magnetic separator which is so designed that a ferromagnetic matrix is placed in a uniform high magnetic field, and returning the non-magnetic particles of the medium into the reactor for re-use.

4 Claims, No Drawings

PROCESS FOR CATALYTIC REACTION OF HEAVY OILS

This application is a continuation, of now abandoned application Ser. No. 288,363, filed July 30, 1981.

BACKGROUND OF THE INVENTION

This invention relates to an improvement in a catalytic reaction process of heavy oils.

The catalytic reaction is performed by contacting crude oils with particulate solid medium, to convert the former to more useful oils. In the petroleum industry, the catalytic reaction is utilized for many processes such as cracking, desulfurization and reforming.

Usually, crude oils contain 5 to 500 ppm of nickel, 5 to 1500 ppm of vanadium, 1 to 100 ppm of iron, and 0.1 to 10 ppm of copper. Since the starting oil, on contact with transporting, storing and processing apparatuses, tends to dissolve the iron of the apparatuses, the actual content of iron in the starting oil greatly exceeds the above-mentioned value. Furthermore, since these metals tend to remain in the distillation bottom, the residual oil contains these metals in amounts at least 2 to 4 times as large as those of the starting oil. In some cases, the residual oils may contain as high as 1000 to 2000 ppm of vanadium. These metals usually exist as organic metal compounds including porphyrin-like compounds.

Thus heavy oils having high metal contents, when they are used as the starting materials for catalytic reactions, the metal components adhere to, and deposit on, the particulate solid medium employed for the reaction. If said medium has a catalytic action, the adhesion and deposition of metals thereon invite such undesirable results as reductions in the catalytic activity and the catalyst's selectivity. It becomes necessary, therefore, that the particles of the medium heavily deposited with the metals should be selectively removed.

On the other hand, if the metals can be positively adhered onto the medium by a certain catalytic method, the metal components can be eliminated from the heavy oils upon removing such a medium. Furthermore, if the particles carrying heavy deposit are separated from those carrying little deposit in the above occasion, and the latter are reused, the medium can be utilized with better effectiveness.

There is also another merit in such a separation that, since most of the metals contained in heavy oils are themselves useful, the selection of the medium particles carrying larger amounts of the metallic deposit would increase the recovering efficiency of the metal components.

SUMMARY OF THE INVENTION

We have engaged in concentrative studies with the view to solve the above problem, and successfully completed a novel catalytic reaction process of heavy oils which enables the selective separation of the medium particles on which larger amounts of the metals are deposited, by an entirely new means.

That is, according to the present invention, a catalytic reaction process of heavy oils with particulate solid medium is provided, the characteristic feature of the catalytic reaction residing in that, a part or the whole of the medium is withdrawn from the reactor, and the withdrawn particles are separated into the magnetic medium particles which have been rendered magnetic by the deposition thereon of the metals contained in the heavy oils such as nickel, vanadium, iron and copper, and the non-magnetic particles, using a high gradient magnetic separator in which a ferromagnetic matrix is placed in a uniform high magnetic field, and the non-magnetic particles are returned into the reactor to be re-used.

The magnetic medium or catalyst particles may be hereinafter referred to simply as magnetic particles (mags) and the non-magnetic medium or catalyst particles, as non-magnetic particles (nonmags).

The "magnetic particles" signify the particles of the medium attracted by a magnetic force to the surface of the matrix placed in the magnetic field in the high gradient magnetic separator. Whereas the "non-magnetic particles" denote those which pass out through the system of the high gradient magnetic separator without being attracted to the surface of the matrix.

DETAILED DESCRIPTION OF THE INVENTION

In our experiments, we impregnated the fine particles of silica-alumina having the grain sizes ranging from 5–200 microns with nickel, vanadium, iron and the like, and calcined them in air and reduced them with hydrogen by way of pre-treatments. Separating the particles then with a high gradient magnetic separator into the magnetic particles and non-magnetic particles and measuring their respective metal contents, we discovered that the metal concentration of the magnetic particles was far higher than that of the non-magnetic particles.

The present invention is completed based on the above novel knowledge acquired by us. That is, according to the present invention, of the particulate solid media used in the various catalytic reactions practiced in the petroleum industry, only those having high metal contents can be selectively separated, and the particles having low metal contents can be put to re-use.

The term "heavy oils" is used in this specification to cover all the oils which are substantially free from the fractions of distillate boiling at 190° C. or below, as well as such oils which are subsequently subjected to hydrodesulfurization. More specifically, the heavy oils include, for example, those containing a substantial amount of distillation residue such as asphaltene, i.e., residual oils from atmospheric distillation of crude oils, residual oils from vacuum distillation of crude oils, crude oils and hydrodesulfurization products of the foregoing. Furthermore, heavy oils not containing a substantial amount of the residue such as asphaltene, for example, light atmospheric distillate, light vacuum distillate, solvent deasphalted oil, residual oils from deasphalting treatment by heating or hydrogenation, mixtures of the foregoing and the purification products of the foregoing by hydrogenation, are also included within the "heavy oils".

The solid medium particles referred to in this specification are the particles of a solid medium, having the diameter not greater than 5 centimeters, preferably from 0.1 to 500 microns. The shape is not critical. The material of the medium again is optional. Although it is preferred that the medium should possess catalytic activity, such is not essential. For example, it may be a heating medium.

In this specification, the term, "catalytic reaction" is used to denote the catalytic reactions in general, excepting fluid catalytic cracking. Thus, all of fluidized bed-, moving bed- and fixed bed-type catalytic reactions are included. For example, such a process may be employed that the medium particles heated to several hundreds degrees centigrade and heavy oils heated to 100°–200° C. are sent into the reactor to be reacted by a moving bed or fluidized bed system and after the reaction the two are separated to recover the oils, the medium being put to re-use. Or, preheated heavy oils may be fed into a reactor packed with the medium and maintained at several hundreds degree centigrade, to effect the reaction.

As a specific example, hydrodesulfurization may be named, which is normally performed under a hydrogen pressure of 60–150 kg cm$^2$, at an LHSV of 0.5–5.0 and at the temperatures ranging 370°–450° C., by any of a fixed bed, moving bed, or fluidized bed system. In that case, the particulate solid medium is a molybdenum catalyst supported on alumina.

Another specific example is a demetallizing treatment. The reaction is performed in the presence of hydrogen, using a demetallizing catalyst, to cause deposition of metals on the catalyst, whereby removing metals from metal-containing heavy oils.

There is also another method in which inorganic oxide particles are used as the solid medium particles, which as a heating medium, are contacted with heavy oils at 800° C. or higher, to cause thermal cracking of the latter and produce light oils, gas, and the like. This method is practiced mainly by a fluidized bed system.

Besides the foregoing, hydrocracking and reforming may be named. Thus, the object of the catalytic reaction process of this invention is not limited to specific types of reaction.

The high gradient magnetic separator (to be abbreviated "HGMS" hereinbelow) is a magnetic separating device which is so designed that a matrix made of a ferromagnetic material is placed in a uniform high magnetic field to generate a very high magnetic gradient such as, normally 2,000×10$^3$–20,000×10$^3$ gauss/cm, around the matrix, and is adapted to attract ferromagnetic or para-magnetic fine particles to the surface of the matrix and separate them from weakly paramagnetic fine particles or diamagnetric fine particles. Usually, the ferromagnetic matrix is an assembly of ferromagnetic fine filaments such as steel wool or steel net having a diameter of 1 to 1,000 μm.

HGMS itself is known, and SALA-HGMS manufactured and sold by SALA company may be cited as an example.

It has previously been known to use a drum-type magnetic separator for separation of ferromagnetic particles having a relatively large particle diameter in magnetic core dressing, etc. The drum-type magnetic separator has a magnetic field strength of about 500 gauss and a magnetic field gradient of about 500 gauss/cm which are much lower than the magnetic field strength and magnetic field gradient of HGMS used in this invention. Such a drum-type magnetic separator can remove iron dust included as an impurity as a result of corrosion or erosion of the apparatus, but is useless in separating the metals deposited on the medium which has been used in the catalytic reactions of heavy oils.

In treating fine solid particles with HGMS, the processes using air, nitrogen, steam or their mixtures as the carrier fluids are referred to as a dry process, and those using water or other liquids as the carrier fluids, as a wet process. Either the dry or wet process may be employed for this invention.

Usually, the strength of the magnetic field, the gradient of the magnetic field, the linear velocity, the concentration of the medium particles, and the treating temperature are the process variables in operating HGMS. The optimum values of the process variables vary greatly depending upon the particle diameter of the solid medium, the kind, state and amount of the deposited metals, the intended separation level, and the selectivity of separation.

The strength of the magnetic field denotes the strength of the magnetic field in which the ferromagnetic matrix is placed. It is usually 1,000 to 20,000 gauss or higher, for both dry and wet processes.

The gradient of the magnetic field denotes the differential with the distance of the strength of the magnetic field generated around the matrix. It can be varied by changing the strength of the magnetic field or the type and diameter of the matrix. Normally it is from 2,000×10$^3$–20,000×10$^3$ gauss cm, for both dry and wet processes.

The concentration of the medium particles denotes that of the particles of the medium to be magnetically separated, in the carrier fluid which may be a gas or liquid. In dry process, it is normally 0.01–100 g/liter, and in wet process, normally 0.01–1000 g/liter.

The treating temperature denotes the temperature of the particles to be separated magnetically. Strictly, it refers to the temperature of nickel, vanadium, iron or copper deposited on the particles. Preferably, the treating temperature is below the Curie temperatures of named metals. Usually, it is room temperature.

It is also possible to appreciably vary the level and selectivity of the separation, by varying the linear velocity of the carrier fluid passing through the magnetic field. When high selectivity is required, the linear velocity should be raised, and vice versa. It is normally 0.01–100 m/sec. in dry process, and 0.01–10,000 m/hr in wet process.

HGMS may be used as incorporated into the line of catalytic reactor, or operated batchwise independently of the line. The medium particles withdrawn from the reactor are separated by the HGMS into magnetic particles on which great amounts of nickel, vanadium, iron and copper are deposited and non-magnetic particles on which these metals are not deposited in great amounts. The weight ratio of the magnetic particles to the non-magnetic particles is highly variable, such as from 1:1000 to 1000:1. Preferably the separation is effected by keeping this weight ratio at from 1:100 to 100:1.

The amounts of the metals deposited on the magnetic particles vary depending upon the type of the medium used in the catalytic reaction, the intended product, the reaction conditions, etc. In terms of nickel equivalent, it is normally 0.05 to 50% by weight, preferably 0.1 to 20% by weight. The nickel equivalent, as referred to herein, is a value expressed by the following equation.

Nickel equivalent=[Ni]+0.25×[V]+0.1×[Fe]+0.1×[Cu]

(where [Ni], [V], [Fe] and [Cu] respectively represent the concentrations (% by weight) of nickel, vanadium, iron and copper)

The magnetic particles thus magnetically separated may be discarded. Or, the metals deposited on the particles may be recovered by such means as ion exchange, chlorination, sulfidation, carbonylation, oxidation and reduction, practiced either singly or in combination. The remaining particles can be re-used.

The process of this invention is very effectively applied to catalytic reactions of heavy oils, preventing the various disadvantages caused by the deposition of metals contained in the heavy oils, such as nickel, iron, vanadium and copper; on the particulate solid medium, i.e., conversion is reduced, increase in undesirable hydrogen and coke contents in the product, whereby induced economic loss; and operation troubles of the reactor. That is, by the subject process comprising, in the occasion of withdrawing a part or the whole of the medium from the reactor for replacing it with new or regenerated medium, separating the withdrawn medium particles into magnetic particles and non-magnetic particles by a high gradient magnetic separator, and recycling the non-magnetic particles still retaining high level of activity and selectivity into the reaction for re-use, it is made possible to inhibit the hydrogen and coke increase in the product and to prevent the reduction in reaction conversion, while reducing the consumption of medium at the same time.

The following Examples illustrate the present invention.

EXAMPLE 1

Silica-alumina particles containing approximately 30% by weight of alumina and having a specific gravity of about 0.4 and an average particle diameter of 60 microns, were impregnated with each several percent of iron, nickel and vanadium, which were then calcined in air and reduced with hydrogen. Those were made the samples identified in Table 1 below.

TABLE 1

| Sample No. | Metal Content |
| --- | --- |
| S-1 | none |
| S-2 | 4.85 wt % of iron |
| S-3 | 4.45 wt % of nickel |
| S-4 | 8.24 wt % of vanadium |

S-2, S-3 and S-4 samples were each blended with S-1 sample at a blend ratio of 1:2 by weight, and the mixtures were separated by a high gradient magnetic separator. A dry process was employed, and the carrier fluid was air. The results were as shown in Table 2, in which P stands for non-magnetic particles, and M, magnetic particles.

TABLE 2

| Run No. | Starting material | Conditions Magnetic Field (KGau) | Air Velocity (m/sec) | Amount treated (g) | Separation (g) | Metal content (wt %) |
| --- | --- | --- | --- | --- | --- | --- |
| 1 | S-2/S-1 | 2.6 | 3.0 | 150 | P 110 | 0.36 |
|   |         |     |     |     | M 40  | 3.99 |
| 2 | S-3/S-1 | 4.2 | 3.6 | 154 | P 100 | 0.01 |
|   |         |     |     |     | M 54  | 3.74 |
| 3 | S-4/S-1 | 20.8 | 0.3 | 150 | P 66  | 0.10 |
|   |         |     |     |     | M 84  | 5.62 |

In Run No. 1, 50 g of the particles impregnated with 4.83 wt % of iron was blended thoroughly with 100 g of the particles impregnated with no metal, and the blend was fed into the high gradient magnetic separator as the starting material. Thus, 40 g of magnetic particles (M) were separated from 110 g of non-magnetic particles (P). Upon metal analysis, the iron content of M was 3.99 wt %, much higher than that of P which was 0.36 wt %. Thus it is confirmed that the particles having a high iron content can be selectively separated as magnetic particles, by the high gradient magnetic separation treatment.

Similar results were obtained as to nickel in Run No. 2, and as to vanadium, in Run No. 3.

EXAMPLE 2

A residual oil from atmospheric distillation was reacted in a microreactor filled with a hydrodesulfurization catalyst. The treatment was continued under constant conditions, until the desulfurization ratio reached a certain level. The treatment was repeated several times, and thereafter the catalyst in the microreactor was withdrawn and separated by a high gradient magnetic separator. Thus separated non-magnetic particles were re-used, and the desulfurization ratio thereby achieved was examined.

TABLE 3

|   | New catalyst | Used catalyst | Non-Magnetic Particles |
| --- | --- | --- | --- |
| Vanadium (wt %) | — | 12.0 | 5.5 |
| Nickel (wt %) | 0.5 | 3.2 | 1.9 |
| Desulfurization Ratio (%) | 87 | 64 | 78 |

| Starting material: | a residual oil from atmospheric distillation of a crude oil of the Middle Eastern origin (sulfur content: 5.0%) |
| --- | --- |
| Conditions: | pressure: 70 Kg/cm$^2$ temperature: 400° C. LHSV: 0.5 |

The results were as given in Table 3 above, from which it can be understood that the used catalyst achieving a markedly reduced desulfurization ratio can again show a sufficiently high catalytic activity, when it is separated by a high gradient magnetic separator and the non-magnetic particles containing little metals deposited thereon only are selectively re-used.

EXAMPLE 3

(1) Silica-alumina fine particles of 10–500 microns in diameter having demetallization activity were used for the reaction in a fluidized bed reactor. A residual oil from vacuum distillation of a crude oil of the Middle Eastern origin was pre-heated, and fed into the furnace as dispersed with steam, under the blowing of nitrogen gas at 700° C. and 1.1 atm G, to effect the reaction. The starting material was continuously fed for 8 hours at a rate of 1.0 liter/hr. The amount of the medium particles used was 500 g.

(2) The medium used in (1) above was withdrawn, and heated at 600° C. for 8 hours in air. Whereupon the carbon deposited on the medium was burnt off. After cooling, the medium was separated into magnetic particles and non-magnetic particles by a high gradient magnetic separator.

TABLE 4

|   | Withdrawn Medium | Magnetic Particles | Non-Magnetic Particles |
| --- | --- | --- | --- |
| Yield (%) | — | 20 | 80 |
| Nickel (ppm) | 1050 | 2250 | 720 |
| Vanadium (ppm) | 3300 | 6900 | 2100 |

As can be understood from Table 4 above, the particles having high metal content as deposited thereon can be selectively separated by means of the high gradient magnetic separation. If the metals are recovered from such particles, the recovering efficiency can be raised, and the non-magnetic particles can be re-used.

We claim:

1. In a process for hydrodesulfurization of heavy oils which comprises reacting said oils with a dehydrosulfurization catalyst under a hydrogen pressure of 60 to 150 kg/cm$^2$ and at a temperature ranging 370° to 450° C., the improvement which comprises withdrawing a part or the whole of the spent catalyst particles from a reactor, feeding the withdrawn catalyst particles by using water as a carrier fluid at a linear velocity of 0.01 to 10,000 meters/hour in a particle connection of 0.1 to 1000 g/liter to a high gradient magnetic separator which is so designed that a ferromagnetic matrix is placed in a uniform high magnetic field, thereby separating the withdrawn catalyst particles into (a) the particles which have been rendered magnetic by the deposition thereon of nickel, vanadium, iron and copper originally contained in the heavy oils, and (b) non-magnetic particles, and returning the non-magnetic particles to the reactor for re-use.

2. The process described in claim 1, in which the high gradient magnetic separator has a magnetic field gradient of from $2,000 \times 10^3$ to $20,000 \times 10^3$ gauss/cm around the matrix.

3. The process described in claim 1, in which the strength of the magnetic field in which the matrix is placed is from 1,000 to 20,000 gauss.

4. The process described in claim 1, in which the ferromagnetic matrix is steel wool or steel net having a diameter of 1 to 1000 μm.

* * * * *